US012582214B2

(12) United States Patent
Kim et al.

(10) Patent No.:  US 12,582,214 B2
(45) Date of Patent:  Mar. 24, 2026

(54) COSMETIC MANUFACTURING METHOD CALCULATION SYSTEM AND METHOD FOR OPERATING SAME

(71) Applicant: LG FAROUK CO., Seoul (KR)

(72) Inventors: Hyung Kyu Kim, Seoul (KR); Jung Yong Lee, Seoul (KR); Kyung Sik Jang, Seoul (KR); Kyung Won Kim, Seoul (KR); Jeong Ho Lee, Seoul (KR)

(73) Assignee: LG FAROUK CO., Seoul (KR)

( * ) Notice: Subject to any disclaimer, the term of this patent is extended or adjusted under 35 U.S.C. 154(b) by 613 days.

(21) Appl. No.: 17/915,935

(22) PCT Filed: Mar. 31, 2020

(86) PCT No.: PCT/KR2020/095059
§ 371 (c)(1),
(2) Date: Sep. 29, 2022

(87) PCT Pub. No.: WO2021/201385
PCT Pub. Date: Oct. 7, 2021

(65) Prior Publication Data
US 2023/0146824 A1     May 11, 2023

(51) Int. Cl.
*A45D 44/00*          (2006.01)
*G06Q 30/0601*       (2023.01)
(Continued)

(52) U.S. Cl.
CPC ....... *A45D 44/005* (2013.01); *G06Q 30/0643* (2013.01); *G06Q 50/04* (2013.01); *G07F 11/70* (2013.01); *A45D 2044/007* (2013.01)

(58) Field of Classification Search
CPC ........... A45D 44/005; A45D 2044/007; A61K 2800/80; A61K 2800/805; A61K 2800/87; A61K 2800/882
See application file for complete search history.

(56) References Cited

U.S. PATENT DOCUMENTS 9,007,588 B1 *   4/2015  Igarashi ................. G05B 15/02
                                                                   356/402
11,055,759 B1 *  7/2021  Natesh ................ G06F 16/9535
                         (Continued)

FOREIGN PATENT DOCUMENTS

JP            3113073 U       9/2005
JP        2006-317689 A      11/2006
                  (Continued)

*Primary Examiner* — Howard Cortes
(74) *Attorney, Agent, or Firm* — Birch, Stewart, Kolasch & Birch, LLP

(57) ABSTRACT

The purpose of the present disclosure is to provide a system for calculating a cosmetic manufacturing method capable of accurately manufacturing dyes and a method for operating same. A terminal may comprise: a storage unit for storing data regarding a dye manufacturing method; an input unit for receiving input of a current color and a target color; and a control unit for calculating a dye manufacturing method for dyeing hair from the current color to the target color on the basis of the data, wherein the control unit calculates the dye manufacturing method including information about cartridges for discharging dye materials and the amount of discharge of the dye material from each of the cartridges.

17 Claims, 17 Drawing Sheets

(51) Int. Cl.
　　*G06Q 50/04*　　　　(2012.01)
　　*G07F 11/70*　　　　(2006.01)

(56)　　　　　　References Cited

U.S. PATENT DOCUMENTS

| | | |
|---|---|---|
| 2010/0088036 A1 | 4/2010 | Goddard-Clark et al. |
| 2014/0082854 A1 | 3/2014 | Landa et al. |
| 2014/0118521 A1 | 5/2014 | Conti et al. |
| 2014/0313302 A1* | 10/2014 | Franke ................. A45D 44/005 |
| | | 348/77 |
| 2014/0323873 A1* | 10/2014 | Cummins ............ G06V 40/162 |
| | | 600/407 |
| 2015/0021356 A1* | 1/2015 | Witchell ............... B01F 33/848 |
| | | 222/23 |
| 2015/0253782 A1* | 9/2015 | Igarashi ............. B01F 33/8442 |
| | | 700/265 |
| 2017/0038297 A1 | 2/2017 | Miklatzky et al. |
| 2017/0071317 A1* | 3/2017 | Miller ................. G06F 3/04847 |
| 2018/0033161 A1 | 2/2018 | Nichol et al. |
| 2018/0125206 A1* | 5/2018 | Shami ................. B05C 11/1036 |
| 2019/0035163 A1* | 1/2019 | Skwarek ............. G06V 40/165 |
| 2019/0059560 A1* | 2/2019 | Miklatzky ............ A45D 19/012 |
| 2021/0145726 A1* | 5/2021 | Herrlein ............... A61K 8/8147 |
| 2021/0304455 A1* | 9/2021 | Liu ........................ G06T 11/001 |
| 2022/0175112 A1* | 6/2022 | Askenazi ............. A61B 5/1032 |
| 2022/0277542 A1* | 9/2022 | Li ........................... G06V 10/22 |
| 2023/0052590 A1* | 2/2023 | Suwanto ................. A61Q 1/12 |
| 2024/0210967 A1* | 6/2024 | Kim ..................... G05D 11/132 |

FOREIGN PATENT DOCUMENTS

| | | | | |
|---|---|---|---|---|
| JP | 5813899 B1 | 11/2015 | | |
| JP | 6574074 B2 | 9/2019 | | |
| KR | 10-1660920 B1 | 9/2016 | | |
| KR | 10-2016-0147828 A | 12/2016 | | |
| KR | 10-2018-0080023 A | 7/2018 | | |
| KR | 10-2071651 B1 | 1/2020 | | |
| WO | WO 2016/167492 A1 | 10/2016 | | |
| WO | WO-2019161360 A1 * | 8/2019 | .......... | A45D 44/005 |

* cited by examiner

Figure 9:
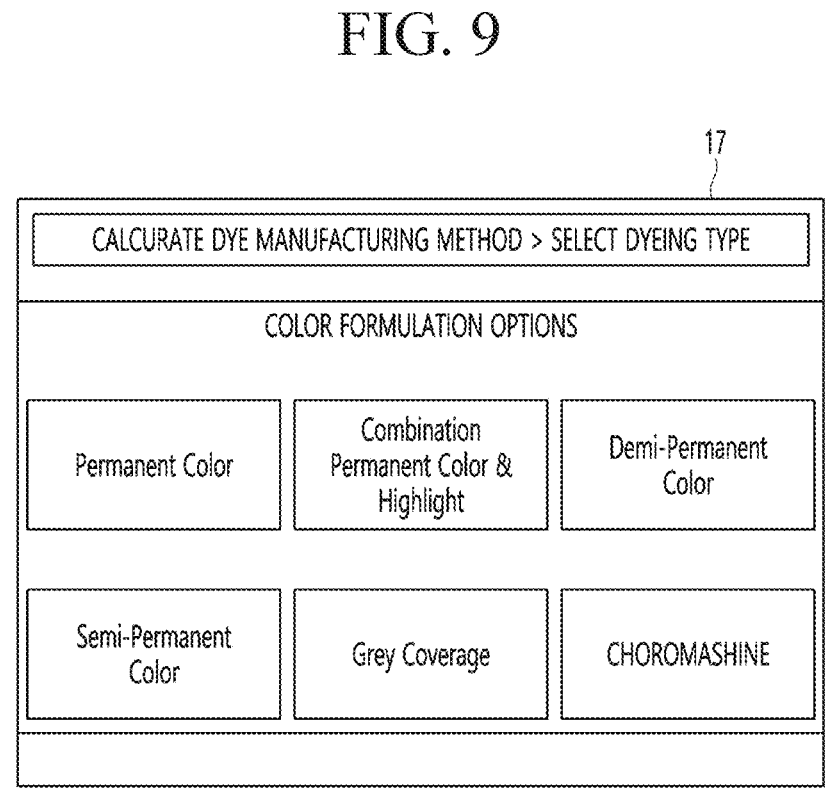

| CALCURATE DYE MANUFACTURING METHOD > SELECT DYEING TYPE |
|---|

COLOR FORMULATION OPTIONS

| Permanent Color | Combination Permanent Color & Highlight | Demi-Permanent Color |
|---|---|---|
| Semi-Permanent Color | Grey Coverage | CHOROMASHINE |

Figure 10:
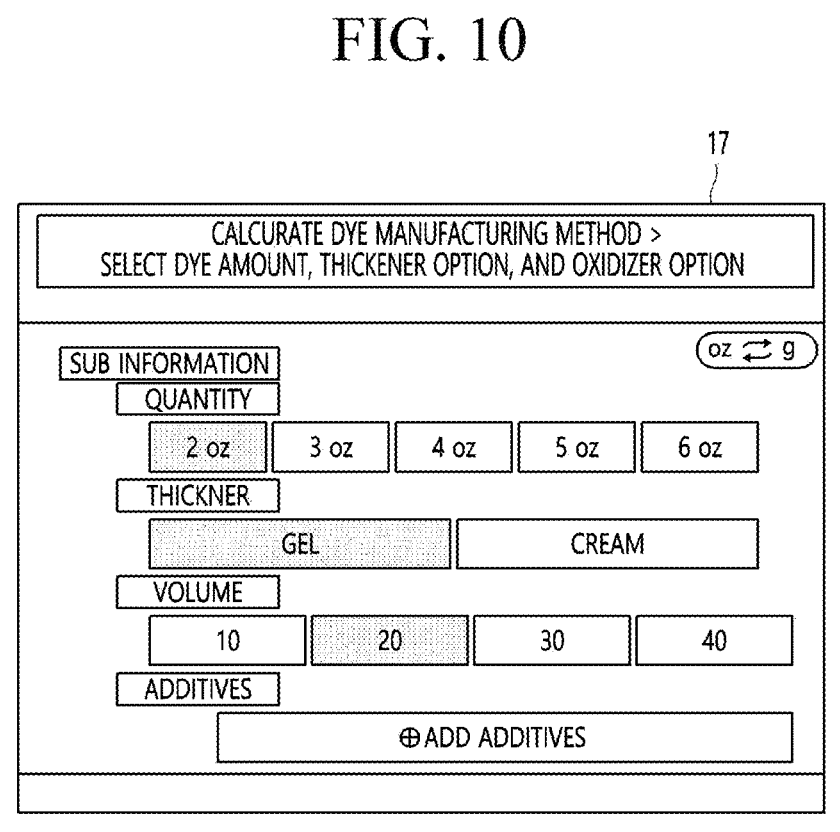

| CALCURATE DYE MANUFACTURING METHOD > |
| SELECT DYE AMOUNT, THICKENER OPTION, AND OXIDIZER OPTION | oz ⇄ g

SUB INFORMATION

QUANTITY

| 2 oz | 3 oz | 4 oz | 5 oz | 6 oz |

THICKNER

| GEL | CREAM |

VOLUME

| 10 | 20 | 30 | 40 |

ADDITIVES

⊕ ADD ADDITIVES

CALCURATE DYE MANUFACTURING METHOD >
SELECT INFORMATION RELATED DYE OF HAIR ZONE

ZONE1  COLOR FORMULATION OPTIONS

| Permanent | Demi-Permanent | Semi-Permanent | Grey Coverage | CHOROMASHINE |
|---|---|---|---|---|

ZONE2  COLOR FORMULATION OPTIONS

| Permanent | Demi-Permanent | Semi-Permanent | Grey Coverage | CHOROMASHINE |
|---|---|---|---|---|

ZONE3  COLOR FORMULATION OPTIONS

| Permanent | Demi-Permanent | Semi-Permanent | Grey Coverage | CHOROMASHINE |
|---|---|---|---|---|

Figure 19:
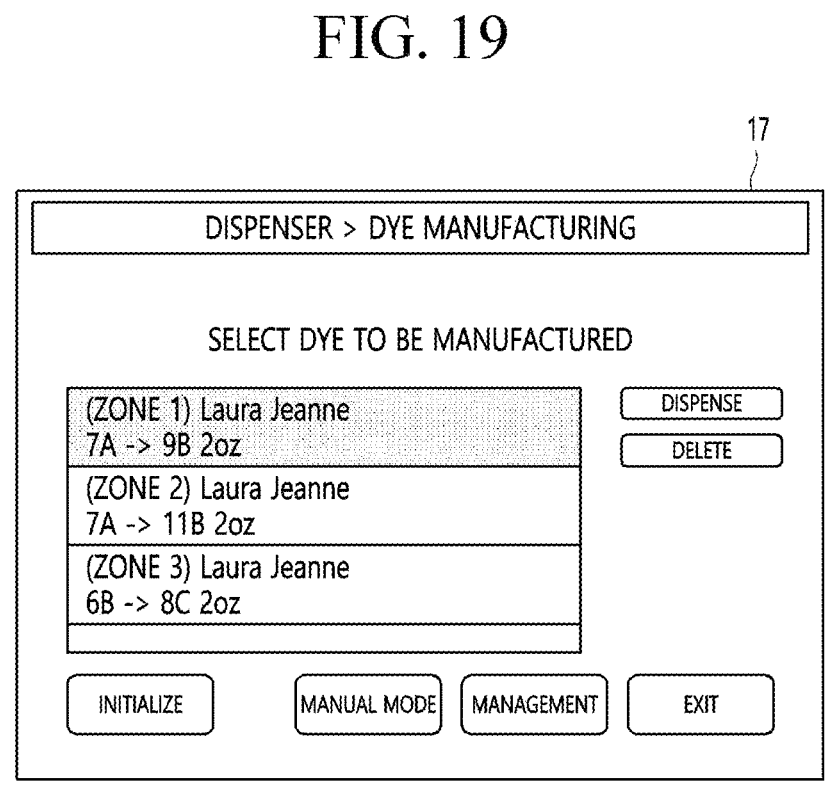

DISPENSER > DYE MANUFACTURING

SELECT DYE TO BE MANUFACTURED (ZONE 1) Laura Jeanne
7A -> 9B 2oz (ZONE 2) Laura Jeanne
7A -> 11B 2oz (ZONE 3) Laura Jeanne
6B -> 8C 2oz

DISPENSE

DELETE

INITIALIZE    MANUAL MODE    MANAGEMENT    EXIT

COSMETIC MANUFACTURING METHOD CALCULATION SYSTEM AND METHOD FOR OPERATING SAME

CROSS REFERENCE TO RELATED APPLICATIONS

This application is the National Phase of PCT International Application No. PCT/KR2020/095059, filed on Mar. 31, 2020, all of which is hereby expressly incorporated by reference into the present application.

TECHNICAL FIELD

The present disclosure relates to a system for calculating a cosmetic manufacturing method and a method of operation thereof.

BACKGROUND ART

Recently, not only the types of cosmetics have been diversified, but also the colors of the same cosmetics have been diversified. In particular, since the skin color and hair color of users are all different, the results may be different even when the same cosmetics are used.

Meanwhile, it is common for dyes that consumers purchase through online and offline have a fixed color. However, since these dyes are manufactured without considering the user's current hair color, hair condition, etc., there is a problem in that they are not dyed with a predetermined color.

Accordingly, consumers frequently visit a hair shop and the like to dye their hair in a desired color and dye their hair through consultation with a hair designer. However, hair designers usually use dyes manufactured by mixing various dye materials through experience and feeling. In addition, even when the hair designer is highly skilled, the type of dye desired by each user is different, and the amount of the dye to be manufactured varies according to the hair length and thickness of the hair, and there may be a limit to accurately manufacturing the dye each time.

Therefore, there may be a need for a system for calculating a cosmetic manufacturing method capable of more accurately making a dye for dyeing a user's desired color according to the user's current hair condition.

DISCLOSURE

Technical Problem

The present disclosure is directed to providing a cosmetic manufacturing method calculation system capable of accurately manufacturing cosmetics, and an operating method thereof.

The present disclosure is directed to providing a cosmetic manufacturing method calculation system for calculating a dye manufacturing method in consideration of a current color and a target color, as well as a type of dye, a capacity of a dye, and the like, and an operating method thereof.

The present disclosure is directed to providing a system for calculating a manufacturing method of a cosmetics and an operating method thereof for calculating a manufacturing method of a dye that allows a user to dye more closely to a color desired by a user by calculating a dye manufacturing method for each hair zone.

Technical Solution

A terminal according to the present disclosure may include a storage unit for storing data on a cosmetic manufacturing method, an input unit for receiving an input of a current color and a target color, and a control unit for calculating a cosmetic manufacturing method for developing from the current color to the target color based on the data, wherein the control unit may calculate a cosmetic manufacturing method including a cartridge for discharging a cosmetic material and a discharge amount of the cosmetic material from each cartridge.

The data may include a table in which the cartridge for discharging the cosmetic material and the discharge amount of the cosmetic material from each cartridge are mapped according to each of the current color and the target color.

The cosmetics may be a dye.

The input unit may further receive an input of a dyeing type, and the control unit may differently calculate the cosmetic manufacturing method according to the dyeing type.

When the current color and the target color are the same but the dyeing type is input differently, the control unit may differently calculate the cosmetic manufacturing method.

The control unit may differently calculate the cosmetic manufacturing method by adjusting at least one of the cartridge for discharging the cosmetic material and the discharge amount.

The control unit may differently calculate the cosmetic manufacturing method by determining a dyeing time using the cosmetics differently.

The input unit may further receive an input of a dye amount, and the control unit may differently calculate the cosmetic manufacturing method by adjusting the discharge amount according to the amount of the dye.

The input unit may further receive an input for adding at least one of a thickener and an oxidizer, and the control unit may modify the cosmetic manufacturing method when receiving the input for adding the thickener or the oxidizer.

The input unit may further receive an input for selecting a hair zone, and the control unit may calculate the cosmetic manufacturing method for each hair zone.

The control unit may calculate the cosmetic manufacturing method so that the discharge amount of the dye material differs depending on the hair zone.

The control unit may calculate the cosmetic manufacturing method by determining a dyeing time to be different depending on the hair zone.

The control unit may further calculate a recommended temperature when the dye is used.

The terminal may further include a communication unit for transmitting the cosmetic manufacturing method to a dispenser for manufacturing the cosmetics.

A dispenser according to an embodiment of the present disclosure includes a storage unit for storing data on a cosmetic manufacturing method, an input unit for receiving an input of a current color and a target color, and a control unit for calculating the cosmetic manufacturing method for developing from the current color to the target color based on the data, wherein the control unit may calculate a cosmetic manufacturing method including a cartridge for discharging a cosmetic material and a discharge amount of the cosmetic material from each cartridge.

A cosmetic manufacturing method calculation system according to an embodiment of the present disclosure may include a dispenser including at least one cartridge for accommodating a cosmetic material and a terminal for calculating a cosmetic manufacturing method for developing from the current color to the target color based on data on the cosmetic manufacturing method when the current color and the target color are input, wherein the terminal may calculate the cosmetic manufacturing method including a cartridge for discharging the cosmetic material and a discharge amount of the cosmetic material from each cartridge.

A cosmetic manufacturing method calculation system according to an embodiment of the present disclosure may include a dispenser including at least one cartridge for accommodating a cosmetic material and storing data for code interpretation and a terminal for generating a code for manufacturing cosmetics and transmitting the generated code to the dispenser when a current color and a target color are input, wherein the dispenser may acquire a cartridge for discharging the cosmetic material and a discharge amount of the cosmetic material from each cartridge by decoding the code.

A method of operating the cosmetic manufacturing method calculation system according to an embodiment of the present disclosure may include storing data on a cosmetic manufacturing method, receiving an input of a current color, receiving an input of a target color, and calculating a cosmetic manufacturing method for developing from the current color to the target color based on the data, wherein the calculating of the cosmetic manufacturing method may include calculating the cosmetic manufacturing method including a cartridge for discharging a cosmetic material and a discharge amount of the cosmetic material from each cartridge.

Advantageous Effects

According to an embodiment of the present disclosure, since a dye manufacturing method is calculated based on data determined depending on a hair condition (current color, length, etc.) of a user, a target color to be dyed, and the like, there is an advantage that the objectivity of dye manufacturing is secured and the reliability is improved. That is, there is an advantage that it is possible to minimize a problem that a dyeing result differs depending on a skill level, condition, and the like of a hair designer, and to calculate a manufacturing method of a dye to be dyed close to a desired state of the user. In addition, there is an advantage that it is possible to minimize the hassle of the hair designer who have difficulties in the dye manufacturing.

According to an embodiment of the present disclosure, since it is possible to manufacture a dye suitable for a state and characteristics of each region for each hair zone, there is an advantage that the quality of dyeing is improved and user satisfaction is increased. In particular, a degree of damage to a tip of hair may be minimized and the entire hair may be colored with the same or similar color by differently calculating the dye manufacturing method for each hair zone, and thus there is an advantage that the quality of dyeing is improved.

DESCRIPTION OF DRAWINGS

FIG. 9 is a view illustrating an example of a method for the terminal according to the embodiment of the present disclosure to receive an input of a dying type.

FIG. 10 is a view illustrating an example of a method for the terminal according to the embodiment of the present disclosure to receive an input of a dye amount, a thickener option, an oxidizer option, and an additional color option.

FIG. 15 is a view illustrating an example of a method for the terminal according to the embodiment of the present disclosure to receive a command for selecting a current color for each hair zone.

FIG. 19 is a view illustrating an example of a screen displayed when the dispenser according to the embodiment of the present disclosure receives a method of manufacturing a dye for each hair zone.

MODES OF THE PRESENT DISCLOSURE

Figure 1:
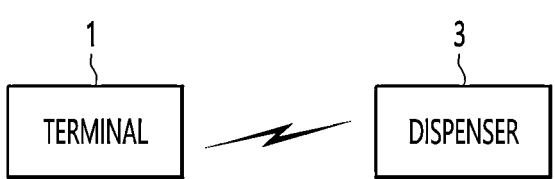
FIG. 1 is a block diagram of a cosmetic manufacturing method calculation system according to an embodiment of the present disclosure.

Hereinafter, embodiments will be described in detail with reference to the accompanying drawings, however, the same components are designated by the same reference numerals, and redundant description thereof will be omitted.

Suffixes "module" and "part" for elements used in the following descriptions are given or used just for convenience in writing the specification, and do not have meanings or roles distinguishable between them.

In addition, in describing embodiments of the present disclosure, when detailed description of a known function is deemed to unnecessarily blur the gist of the present disclosure, the detailed description will be omitted. Further, accompanying drawings are only for easily understanding embodiments disclosed in the present disclosure, and the technical spirit disclosed in the present disclosure are not limited by the accompanying drawings, and it should be understood that the present disclosure includes all modifications, equivalents, and alternatives falling within the spirit and scope of the claims.

It should be understood that, although the terms first, second, and the like may be used herein to describe various elements, these elements are not limited by these terms. The terms are only used to distinguish one element from another.

Elements referred to in singular may be number one or more, unless the context clearly indicates otherwise.

It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a block diagram of a cosmetic manufacturing method calculation system according to an embodiment of the present disclosure.

The cosmetic manufacturing method calculation system according to the embodiment of the present disclosure a may include a terminal 1 and a dispenser 3.

The present disclosure includes the cosmetic manufacturing method system constituting the terminal 1 for calculating a cosmetic manufacturing method and the dispenser 3 for manufacturing cosmetics. Here, the cosmetics may include not only products used for a face and skin of a user, such as foundation, basic cosmetics, and color cosmetics but also products used for the user's nails and toenails, such as manicure and gel manicure, a dye used for the user's hair, and the like.

Meanwhile, in the present specification, for convenience of description, it has been described that the terminal 1 calculates a method of manufacturing the cosmetics, in particular, the dye, and the dispenser 3 manufactures the dye, but the present disclosure is not limited thereto.

The terminal 1 and the dispenser 3 may communicate with each other by wire or wirelessly.

The terminal 1 may receive an input for controlling an operation of the dispenser 3, and in this case, the terminal 1 may transmit a signal for controlling the operation of the dispenser 3 according to input information to the dispenser 3.

Specifically, the terminal 1 may receive an input on dye-related information and calculate a dye manufacturing method based on the received dye-related information. The terminal 1 may transmit the calculated the dye manufacturing method to the dispenser 3, and the dispenser 3 may manufacture the dye according to the dye manufacturing method received from the terminal 1.

The terminal 1 may display various screens for receiving an input on the dye-related information.

In addition, the terminal 1 may display operation information of the dispenser 3. For example, the terminal 1 may display a current state of the dispenser 3, information on the cosmetics to be provided from the dispenser 3, a simulation that is a prediction result when the cosmetics to be provided from the dispenser 3 are used, and the like.

The terminal 1 may be a smart phone, but this is merely illustrative, and may include a wearable device such as a smart watch, a tablet PC, a laptop computer, a desktop, and the like.

The dispenser 3 may be a device that provides a dye.

The dye described herein is manufactured to change a color of a hair, and the type thereof, such as a cream type, a foam type, and the like may be varied.

The dispenser 3 may provide the dye according to a signal received from the terminal 1. According to an embodiment, the dispenser 3 may be provided with a plurality of dye materials and may manufacture the dye by discharging or mixing the provided dye materials to provide the dye. According to another embodiment, the dispenser 3 may be provided with a dye already manufactured for immediate use and may discharge the provided dye to provide the dye.

Hereinafter, it is assumed that the dispenser 3 provides the dye manufactured by discharging and/or mixing the plurality of dye materials, but this is merely illustrative for convenience of description, and thus it is reasonable that the present disclosure is not limited thereto.

Figure 2:
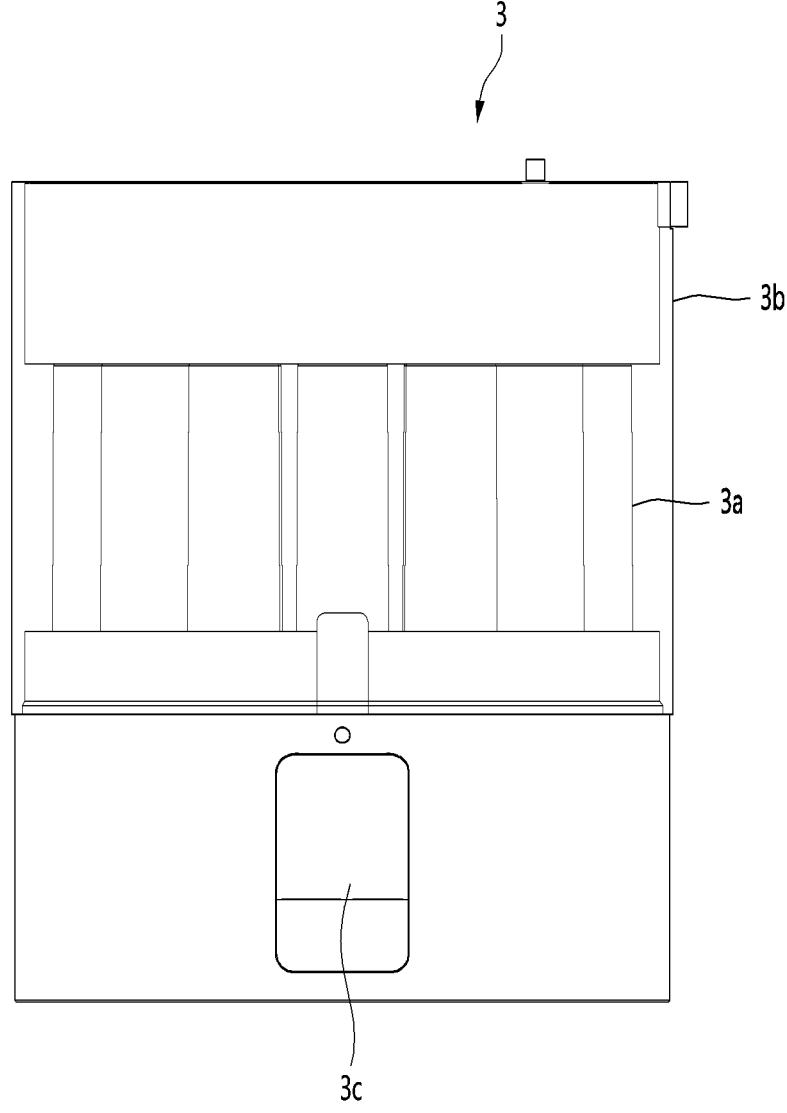
FIG. 2 is a view illustrating a dispenser for providing a dye according to an embodiment of the present disclosure.

FIG. 2 is a view illustrating a dispenser for providing a dye according to an embodiment of the present disclosure.

The dispenser 3 may include a plurality of cartridges 3a including a dye material, and a case 3b for accommodating the cartridges 3a. The dye material used for manufacturing the dye may be provided in each of the plurality of cartridges 3a. In addition, a door 3c through which the dye is provided may be formed in the case 3b. The dye manufactured in the dispenser 3 may be provided to the user through the door 3c.

Meanwhile, the dispenser 3 shown in FIG. 2 is merely illustrative, and the dispenser 3 may include all devices capable of providing the dye.

The dye material may include raw materials, compositions, and the like included in the dye. That is, the dye material may include all raw materials and/or compositions used for manufacturing the dye. For example, the dye material may include a colorant, an oxidizer, a thickener, and the like.

The plurality of cartridges 3a may include a plurality of cartridges accommodating the colorant, a cartridge accommodating the oxidizer, a cartridge accommodating a thickener, and the like.

Figure 3:
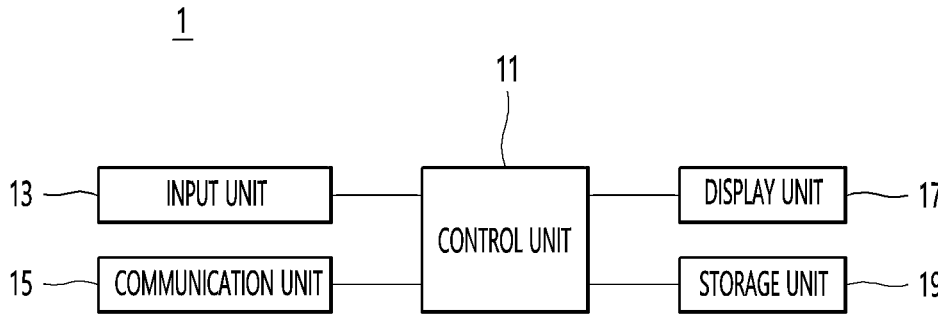
FIG. 3 is a control block diagram of a terminal according to an embodiment of the present disclosure.

FIG. 3 is a control block diagram of a terminal according to an embodiment of the present disclosure.

The terminal 1 may include at least some or all of a control unit 11, an input unit 13, a communication unit 15, a display unit 17, and a storage unit 19.

The control unit 11 may control the overall operation of the terminal 1. The control unit 11 may control each of the input unit 13, the communication unit 15, the display unit 17, and the storage unit 19.

The input unit 13 may receive various information from the user. The input unit 13 may receive dye-related information.

The dye-related information may refer to information on a dye to be manufactured. For example, the dye-related information may include information on a current color and a target color.

The current color may refer to a color of a region that the user intends to dye.

The target color may refer to a color predicted to be developed according to the use of the dye.

In addition, the dye-related information may further include sub-information in addition to the current color and the target color. The sub-information may refer to information on various characteristics other than the color of the dye. For example, the sub-information may include information on a dyeing type, a dye amount, a thickener, an oxidizer, and the like.

The input unit 13 may be formed of a touch screen or the like or may include a physical key button.

The communication unit 15 may communicate with an external device such as the dispenser 3. The communication unit 15 may transmit a dye manufacturing method to the dispenser 3.

The communication unit 15 may include a mobile communication module (not shown), a short-range communication module (not shown) such as Bluetooth, and the like in order to transmit/receive signals to and from the external device such as the dispenser 3.

In addition, the communication unit 15 may communicate with an external server (not shown). The control unit 11 may control the communication unit 15 so as to assign a globally unique identifier (GUID) to the calculated dye manufacturing method whenever the dye manufacturing method is calculated, and to transmit the assigned GUID to the external server (not shown).

The external server (not shown) may receive the GUID from the terminal 1 or the dispenser 3 and store the received GUID. The external server (not shown) may confirm whether the dye is well discharged by matching the dye discharged from the dispenser 3 with the GUID.

In addition, the external server (not shown) may store a hair color preferred by the user, such as by store, region, age, member, and gender.

The display unit 17 may display a screen for receiving various information input from the user. For example, the display unit 17 may display a color table for receiving at least one of the current color and the target color. As another example, the display unit 17 may display a simulation that is a prediction result when the dye to be manufactured is used.

As described above, the display unit 17 may display information related to an operation of the terminal 1 and information related to an operation of the dispenser 3.

The storage unit 19 may store various information related to the operation of the terminal 1.

For example, the storage unit 19 may store a code generation method. Specifically, the storage unit 19 may store a code generation method for generating a code for manufacturing a dye corresponding to information input through the input unit 13. In this case, the code indicates the dye manufacturing method, and may be composed of a character indicating the current color, a character indicating a target color, a character indicating a dye amount, and a character indicating a dye formulation. For example, a code P2N8A2Y2 may be a code set to provide cosmetics which is a manufacturing option of permanent, the current color is 2N, the target color is 8A, the cosmetic amount is 2 oz, the thickener type is cream, and the oxidizer amount is 20 volumes, but as each letter is changed, the current color, target color, dye amount, dye formulation, and the like may be changed.

In this case, the dispenser 3 may calculate the dye manufacturing method by decoding the code.

As another example, the storage unit 19 may store data on a dye manufacturing method.

The dye manufacturing method may include a cartridge for discharging the dye material and an amount of the dye material discharged from each cartridge. In addition, the dye manufacturing method may further include a dyeing time, a recommended temperature when the dye is used, and the like in addition to the cartridge and the discharge amount.

The data on the dye manufacturing method may include an algorithm for determining the dye material to be included in the dye as information related to the dye is input. Alternatively, the data on the dye manufacturing method may include a table in which the cartridge to be discharged of the dye material and the discharge amount of the dye material from each cartridge are mapped in advance according to each of the current color and the target color. In addition, the table may further map the cartridge from which the dye material is to be discharged and the discharge amount thereof according to sub-information in addition to the current color and the target color.

When dye-related information is input, the control unit 11 may calculate the dye manufacturing method based on data on the dye manufacturing method.

Such data may be data generated and updated through experiences of hair designers. Alternatively, the data may be generated based on a previously generated dye manufacturing method and may be updated data as feedback according to a dyeing result is received. In this case, dye management, customer management, history management, and big data may be formed.

Meanwhile, the data on the dye manufacturing method may include a color table indicating a plurality of colors. In such a color table, at least one of discharge information for each of a plurality of colors (e.g., FA0, C1C, 898, 514, 190, etc.), pantone colors (e.g., 1R02, 1Y02, 2Y02, 3Y03, 4Y02, etc.) that are the basis of simulation, and RGB values of the color (e.g., rgb (254, 233, 224), rgb (254, 242, 222), etc.) represented in the color table may be mapped.

For example, when a color corresponding to a pantone color 1Y05 or RGB values 251, 200, and 162 is selected from the color table, the control unit 11 may acquire a hexadecimal 7DB as discharge information mapped to the selected color. When 7DB which is a hexadecimal number is converted to a decimal number, it may be 2011, which may refer to that it should be discharged by the cosmetic composition of cartridge 1 is 2, the cosmetic composition of cartridge 2 is 0, the cosmetic composition of cartridge 3 is 1, the cosmetic composition of cartridge 4 is 1. Therefore, the control unit 11 may interpret the discharge information of the hexadecimal number mapped to the color selected from the color table to acquire the cartridge from which the dye material is to be discharged and the discharge amount of the dye material from each cartridge.

In this case, although discharge information for each color included in the color table is included as a hexadecimal code, the type of cosmetic composition included in each cartridge may be protected.

Meanwhile, the components of the terminal 1 shown in FIG. 3 are merely illustrative, and some of the components shown in FIG. 3 may be omitted or additional components may be added in addition to the components shown in FIG. 3.

Figure 4:
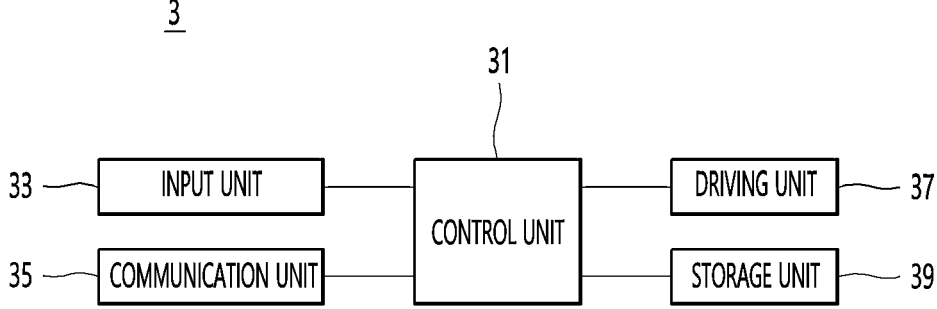
FIG. 4 is a control block diagram of the dispenser according to an embodiment of the present disclosure.

FIG. 4 is a control block diagram of the dispenser according to an embodiment of the present disclosure.

The dispenser 3 may include at least some or all of a control unit 31, an input unit 33, a communication unit 35, a driving unit 37, and a storage unit 39.

The control unit 31 may control the overall operation of the dispenser 3. The control unit 31 may control each of the input unit 33, the communication unit 35, the driving unit 37, and the storage unit 39.

The input unit 33 may receive various information from the user. For example, the input unit 33 may receive the dye-related information, and in this case, the dispenser 3 may manufacture the dye without receiving the dye manufacturing method from the terminal 1. That is, according to an embodiment, the dispenser 3 may directly receive the dye-related information to calculate the dye manufacturing method.

In addition, the input unit 33 may receive a dye manufacturing command, a dye manufacturing stop command, and the like.

The input unit 33 may be formed of a touch screen or the like, or may include a physical key button.

The communication unit 35 may communicate with an external device such as the terminal 1. The communication unit 35 may receive the dye manufacturing method from the terminal 1. In addition, the communication unit 35 may receive the dye manufacturing command, the dye manufacturing stop command, and the like from the terminal 1.

The communication unit 35 may include a mobile communication module (not shown) and a short-range communication module (not shown) such as Bluetooth.

The control unit 31 may control the communication unit 35 so as to assign a GUID each time the dye is manufactured and to transmit the assigned GUID to an external server (not shown).

The driving unit 37 may operate so as to provide the dye according to the dye manufacturing method. The driving unit 37 may discharge the dye material accommodated in the at least one cartridge 3a so that the dye is provided to the user. For example, the driving unit 37 may include a cartridge rotation motor (not shown), a discharge motor (not shown), a container transfer motor (not shown), and the like that operate to discharge the dye material from the at least one cartridge 3a, but this is merely illustrative for the convenience of description.

The storage unit 39 may store dye manufacturing information. The dye manufacturing information may include a method of driving the driving unit 37 so as to manufacture the dye according to the dye manufacturing method.

In addition, the storage unit 39 may store data for code analysis. For example, the storage unit 39 may store a code interpretation table as data for code analysis. The code interpretation table may indicate the type of cartridge to discharge the cosmetic composition for each of the current color and the target color and the discharge amount from each cartridge.

For example, when receiving a code such as P5N8V2X2B1, based on the code interpretation table, the control unit 31 may control the driving unit 37 to discharge 14 g of a cosmetic composition from a fourth cartridge, 1 g of cosmetic composition from a fifth cartridge, 15 g of a cosmetic composition from an eighth cartridge, 15 g of a cosmetic composition from an eleventh cartridge, 15 g of a cosmetic composition from a twelfth cartridge.

Therefore, when receiving the code from the terminal 1, the control unit 31 may interpret the code based on the code interpretation table and control the driving unit 37 so as to manufacture the dye based on interpretation information of the code.

Meanwhile, the components of the dispenser 3 shown in FIG. 4 are merely illustrative, and some of the components shown in FIG. 4 may be omitted, or additional components may be added in addition to the components shown in FIG. 4. For example, the dispenser 3 may further include a display unit (not shown) for displaying operation information and the like of the dispenser 3.

In addition, although it has been described above that the terminal 1 calculates the dye manufacturing method, the dispenser 3 may also calculate the dye manufacturing method. Specifically, the storage unit 39 stores data on the dye manufacturing method, the input unit 33 receives an input of the current color and the target color, and the control unit 31 may calculate the dye manufacturing method for dyeing hair from the current color to the target color based on the data stored in the storage unit 39.

Figure 5:
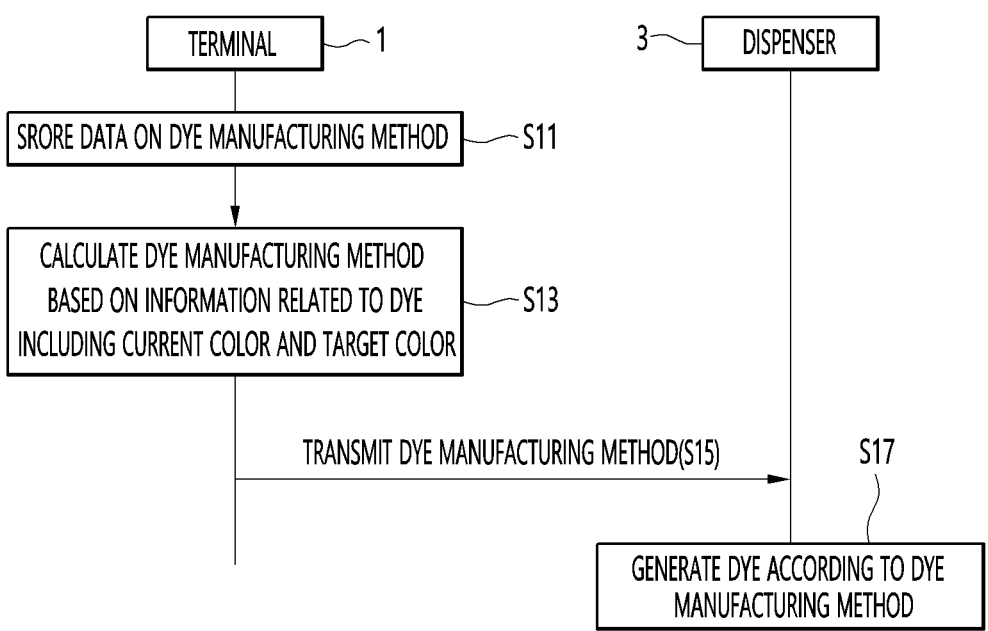
FIG. 5 is a flowchart illustrating a method of operation the cosmetic manufacturing method calculation system according to an embodiment of the present disclosure.

FIG. 5 is a flowchart illustrating a method of operating the cosmetic manufacturing method calculation system according to an embodiment of the present disclosure.

The terminal 1 may store data on the dye manufacturing method in step S11.

The terminal 1 may have previously stored data on the dye manufacturing method in the storage unit 19.

The terminal 1 may calculate the dye manufacturing method based on dye-related information including the current color and the target color in step S13.

The terminal 1 receives the dye-related information including the current color and the target color through the input unit 13, and the control unit 11 may calculate the dye manufacturing method based on the dye-related information received through the input unit 13.

According to an embodiment, the terminal 1 may calculate the dye manufacturing method by receiving dye-related information for manufacturing a dye to be used for the entire hair of the user.

According to another embodiment, the terminal 1 may divide the user's hair into a plurality of zones and receive dye-related information for manufacturing a dye to be used in each of the plurality of divided hair zones to calculate the dye manufacturing method in plural.

That is, the terminal 1 may provide a function of calculating the dye manufacturing method for each hair zone. As described above, when the dye manufacturing method is calculated for each hair zone, it is possible to calculate differently the dye manufacturing method for each hair zone, and accordingly, it is possible to manufacture a dye suitable for a state and characteristics of each zone for each hair zone, and thus there is an advantage that the quality of dying is improved and user satisfaction is increased. As a specific example, since the user's previously dyed hair has a different color and degree of damage between a zone close to the scalp and a zone close to the tip of the hair, when the entire hair is dyed with the same dye, the case of dyeing for each zone may be different. As another example, when there is a user who wants to dye two or more colors such as two-tone according to their taste, it is necessary to manufacture a different dye for each hair zone. In such a case, there is an advantage that the efficiency of manufacturing the dye is increased by calculating the dye manufacturing method for each hair zone.

Next, with reference to FIG. 6, a method for a terminal according to an embodiment of the present disclosure to calculate a dye manufacturing method will be described.

Figure 6:
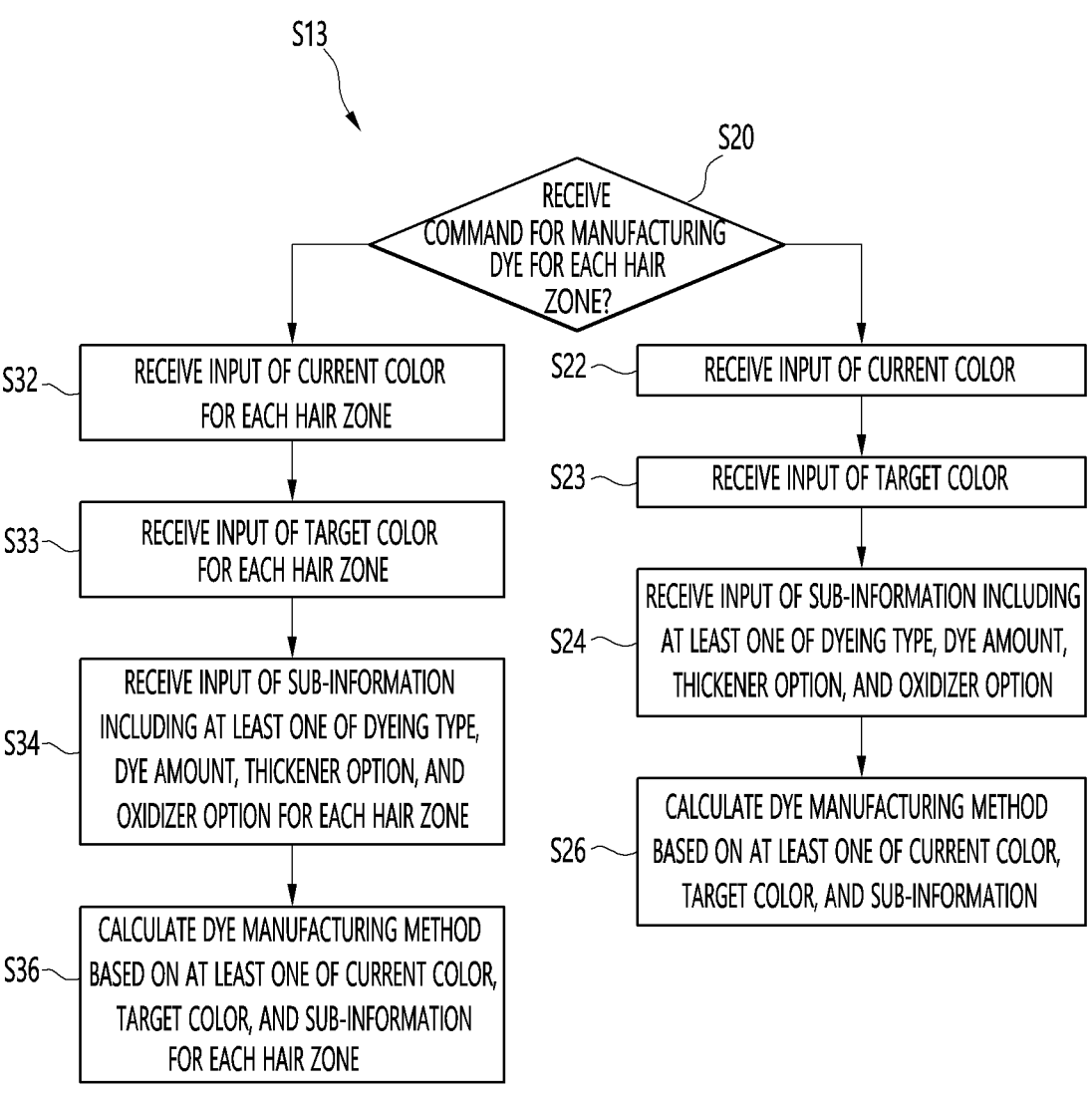
FIG. 6 is a flowchart illustrating a method for the terminal according to the embodiment of the present disclosure to calculate a dye manufacturing method.

FIG. 6 is a flowchart illustrating the method for the terminal according to the embodiment of the present disclosure to calculate the dye manufacturing method. FIG. 6 may be a flowchart in which the step S13 of FIG. 5 is embodied.

The control unit 11 may determine whether a manufacturing command of the dye for each hair zone has been received in step S13.

The control unit 11 may receive an input from the user as to whether to manufacture or not to manufacture the dye for each hair zone and determine whether to manufacture or not to manufacture the dye for each hair zone according to the received input.

Figure 7:
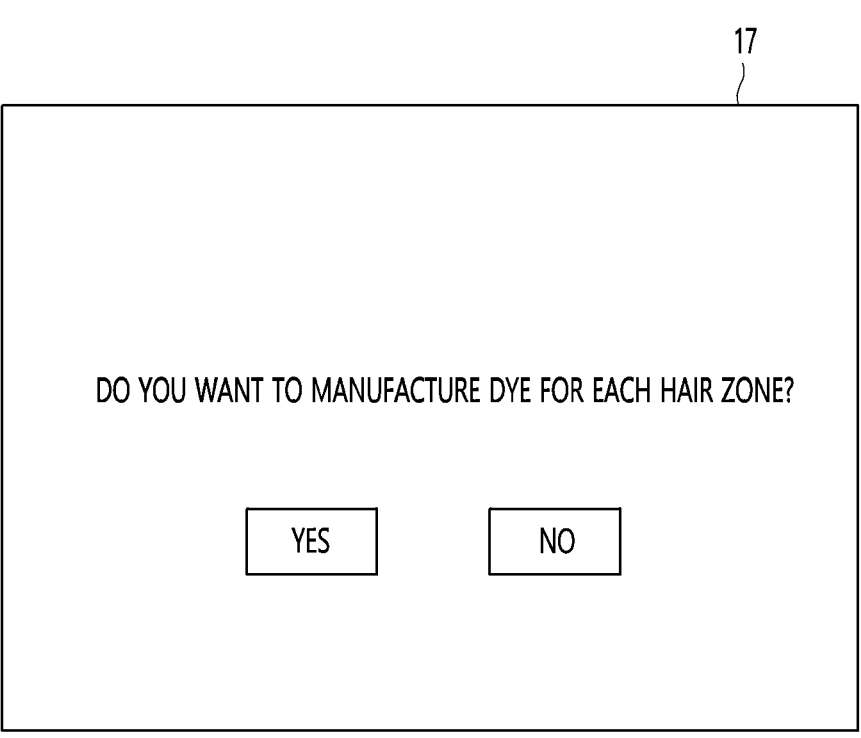
FIG. 7 is a view illustrating an example of a method of determining whether the terminal according to the embodiment of the present disclosure has received a command for manufacturing a dye for each hair zone.

FIG. 7 is a view illustrating an example of a method of determining whether the terminal according to the embodiment of the present disclosure has received a command for manufacturing a dye for each hair zone.

The display unit 17 may display a screen for confirming whether to manufacture or not to manufacture the dye for each hair zone. For example, the display unit 170 may display at least one of a message asking whether to manufacture or not to manufacture the dye for each hair zone, a confirmation icon (e.g., 'Yes'), and a cancel icon (e.g., 'No').

The control unit 11 may determine whether the command for manufacturing the dye for each hair zone is received based on the input received through the input unit 13 while the screen for confirming whether or not to manufacture the dye for each hair zone is displayed. For example, when receiving a command for selecting the confirmation icon while being displayed on the screen as shown in FIG. 7, the control unit 11 may determine that the command for manufacturing the dye for each hair zone has been received, and when receiving the command for selecting the cancel icon, the control unit 11 may determine that the command for manufacturing the dye for each hair zone has not been received.

FIG. 6 will be described again.

When the command for manufacturing the dye for each hair zone is not received, the control unit 11 may receive an input of the current color in step S22 and an input of the target color in step S23.

Figure 8:
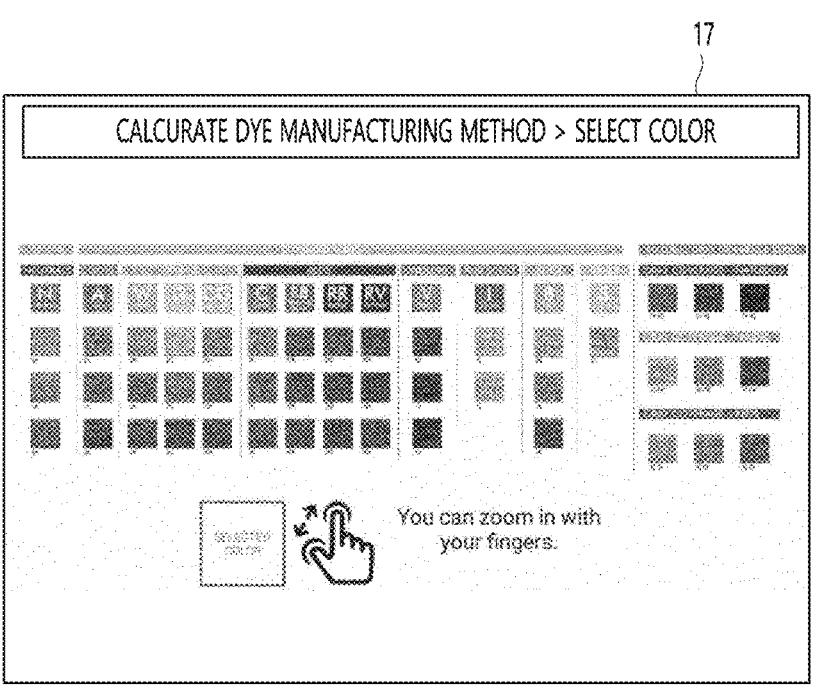
FIG. 8 is a view illustrating an example of a method for the terminal according to the embodiment of the present disclosure to receive an input of a current color or a target color.

FIG. 8 is a view illustrating an example of a method for the terminal according to the embodiment of the present disclosure to receive an input of a current color or a target color.

As shown in FIG. 8, the control unit 11 may control the display unit 17 to display a plurality of colors and receive the input of the current color or the target color through the command for selecting any one of the plurality of colors displayed on the display unit 17.

Meanwhile, according to an embodiment, the cosmetic manufacturing method calculation system may further include a scanner (not shown) and may receive the input of the current color through the scanner (not shown). The scanner (not shown) may be a device capable of measuring the color of hair. The scanner (not shown) may be a part of the terminal 1.

FIG. 6 will be described again.

When receiving the input of the current color and the target color, the control unit 11 may receive an input of sub-information including at least one of a dyeing type, a dye amount, a thickener, and an oxidizer in step S24.

The control unit 11 may or may not receive the input of the sub-information. That is, the user may or may not input the sub-information.

When the input of the sub-information is not received, the control unit 11 may calculate the dye manufacturing method for dyeing hair from the current color to the target color based on the data on the dye manufacturing method stored in the storage unit 19.

For example, when the current color is 4N and the target color is 5N, the control unit 11 may calculate the dye manufacturing method through a table as shown in an example of Table 1 below.

TABLE 1

| Starting Color | Desired Color | Dye cartridge number | | | | | | | | | |
|---|---|---|---|---|---|---|---|---|---|---|---|
| | | 1 | 2 | 3 | 4 | 5 | 6 | 7 | 8 | 9 | 10 |
| 4N | 5N | | 10 | | 20 | | | 30 | | | |

Examples of sub-information include, but are not limited to, a dying type, a dye amount, a thickener option, and an oxidizer option, and the like.

FIG. 9 is a view illustrating an example of a method for the terminal according to the embodiment of the present disclosure to receive an input of a dying type, and FIG. 10 is a view illustrating an example of a method for the terminal according to the embodiment of the present disclosure to receive an input of a dye amount, a thickener option, an oxidizer option, and additional color option.

Referring to FIG. 9, the display unit 17 may display a plurality of dyeing types, and the control unit 11 may receive an input of a dyeing type through a command for selecting any one of the plurality of dyeing types.

Examples of dyeing types may include permanent color, combination permanent color & highlight, first demi-permanent color, second semi-permanent color, gray coverage, and chroma shine dying, but this is merely illustrative, and thus the present disclosure is not limited thereto.

That is, the input unit 13 may further receive an input of the dyeing type, and the control unit 11 may differently calculate the dye manufacturing method according to the dyeing type. When the current color and the target color are the same but the dyeing type is input differently, the control unit 11 may differently calculate the dye manufacturing method. For example, when the current color is 4N and the target color is 5N, which is the same for each type of dyeing, but the types of dyeing are respectively different for the permanent color, the first demi-permanent color, and the second semi-permanent color, the control unit 11 may calculate the dye manufacturing method so that the dye material, the dyeing time, or the like is different as shown in the example of Table 2 below.

TABLE 2

| Type of dyeing | Starting Color | Desired Color | Dye cartridge number | | | | | | | | | | Total | Timing |
|---|---|---|---|---|---|---|---|---|---|---|---|---|---|---|
| | | | 1 | 2 | 3 | 4 | 5 | 6 | 7 | 8 | 9 | 10 | | |
| Permanent Color | 4N | 5N | | 10 | | 20 | | | 30 | | | | 60 | 60 min |
| Demi-Permanent Color | 4N | 5N | | 6.67 | | 13.33 | | 20 | 20 | | | | 60 | 45 min |
| Semi-Permanent Color | 4N | 5N | | 6.67 | | 13.33 | | 20 | 20 | | | | 60 | 30 min |

That is, when the current color and the target color are the same but the dyeing type is input differently, the control unit 11 may differently calculate the dye manufacturing method by adjusting at least one of the cartridge for discharging the dye material and the discharge amount, or may differently calculate the dye manufacturing method by determining the dyeing time using the dye.

Referring to FIG. 10, the display unit 17 may display 2 oz, 3 oz, 4 oz, 5 oz, and 6 oz, etc. as the dye amount (QUANTITY), and the control unit 170 may receive an input of the dye amount through a command for selecting any one of the displayed 2 oz, 3 oz, 4 oz, 5 oz, 6 oz, etc.

That is, the input unit 13 may further receive an input of the dye amount, and the control unit 11 may differently calculate the dye manufacturing method by adjusting the discharge amount according to the dye amount. For example, when the current color is 4N and the target color is 5N, which is the same for each type of dyeing, but the dye amount is 2 oz, 3 oz, 4 oz, 5 oz, and 6 oz, respectively, the control unit 11 may differently calculate the dye manufacturing method as shown in the example in Table 3 below.

TABLE 3

| Dye amount | Starting Color | Desired Color | Dye cartridge number | | | | | | | | | | | Total | Timing |
|---|---|---|---|---|---|---|---|---|---|---|---|---|---|---|---|
| | | | 1 | 2 | 3 | 4 | 5 | 6 | 7 | 8 | 9 | 10 | | |
| 2 oz | 4N | 5N | | 10 | | 20 | | | 30 | | | | 60 | 60 min |
| 3 oz | 4N | 5N | | 15 | | 30 | | | 45 | | | | 90 | 60 min |
| 4 oz | 4N | 5N | | 20 | | 40 | | | 60 | | | | 120 | 60 min |
| 5 oz | 4N | 5N | | 25 | | 50 | | | 75 | | | | 150 | 60 min |
| 6 oz | 4N | 5N | | 30 | | 60 | | | 90 | | | | 180 | 60 min |

In addition, the input unit 13 may further receive an input for adding at least one of a thickener and an oxidizer, and the control unit 11 may modify the dye manufacturing method when receiving the input for adding the thickener or the oxidizer. That is, the control unit 11 may modify the dye manufacturing method so that the thickener or the oxidizer is added to the dye manufacturing method calculated based on the current color and the target color.

As an example, the display unit 17 may display GEL and CREAM as a thickener type, and the control unit 11 may receive an input of a thickener option through a command for selecting any one of the displayed GEL and CREAM. In addition, when the thickener type is selected, the control unit 11 may determine that the input for adding the thickener is received. In this case, the control unit 11 may modify the dye manufacturing method so that the thickener is added as shown in Table 4 below.

TABLE 4

| | Starting Color | Desired Color | Dye cartridge number | | | | | | | | | | Thickener | Total | Timing |
|---|---|---|---|---|---|---|---|---|---|---|---|---|---|---|---|
| | | | 1 | 2 | 3 | 4 | 5 | 6 | 7 | 8 | 9 | 10 | | | |
| | 4N | 5N | | 10 | | 20 | | | 30 | | | | | 60 | 60 min |
| add thickener | 4N | 5N | | 10 | | 20 | | | 30 | | | | 3 | 63 | 60 min |

As another example, the display unit 17 may display 10, 20, 30 and 40 as the oxidizer amount (VOLUME), and the control unit 11 may receive an input of an oxidizer option through a command for selecting any one of the displayed 10, 20, 30 and 40, etc. When the oxidizer option is selected, the control unit 11 may determine that an input for adding an oxidizer is received. In this case, the control unit 11 may modify the dye manufacturing method so that the oxidizer is added as shown in Table 5 below. In addition, according to the embodiment, the type of the oxidizer may be two or more.

TABLE 5

| Oxidizer option | Starting Color | Desired Color | 1 | 2 | 3 | 4 | 5 | 6 | 7 | 8 | 9 | 10 | Oxidizer 1 | Oxidizer 2 | Total | Timing |
|---|---|---|---|---|---|---|---|---|---|---|---|---|---|---|---|---|---|
| 10 | 4N | 5N | | 10 | | 20 | | | | | | | 5 | 25 | 60 | 60 min |
| 20 | 4N | 5N | | 10 | | 20 | | | | | | | 15 | 15 | 60 | 60 min |

TABLE 5-continued

| Oxidizer option | Starting Color | Desired Color | 1 | 2 | 3 | 4 | 5 | 6 | 7 | 8 | 9 | 10 | Oxidizer 1 | Oxidizer 2 | Total | Timing |
|---|---|---|---|---|---|---|---|---|---|---|---|---|---|---|---|---|
| 30 | 4N | 5N | | 10 | | 20 | | | | | | | 20 | 10 | 60 | 60 min |
| 40 | 4N | 5N | | 10 | | 20 | | | | | | | 30 | 0 | 60 | 60 min |

In addition, the control unit 11 may receive an option of additional colors (ADDITIVES). The display unit 17 may display an additional color option icon (+ ADD ADDITIVES) through which an additional color may be input, and according to a command for selecting the additional color option icon, the control unit 11 may add a dye material to develop a different color in addition to the dye material included based on the current color and the target color. Through this, there is an advantage that the hair designer may more easily manufacture the dye by easily adding other dye materials in addition to the dye materials automatically selected according to the individual's know-how.

Meanwhile, since FIG. 10 is merely illustrative, it is appropriate that the present disclosure is not limited thereto.

FIG. 6 will be described again.

The control unit 11 may calculate the dye manufacturing method based on at least one of the current color, the target color, and the sub-information in step S26.

The control unit 11 may calculate the dye manufacturing method corresponding to the input current color, target color, and the sub-information based on the data on the dye manufacturing method. Since the calculation method of the dye manufacturing method has been described through Table 1 to Table 5, a redundant description will be omitted.

However, the above Table 1 to Table 5 are also merely illustrative, and the control unit 11 may calculate the dye manufacturing method based on at least one of the current color, target color, and the sub-information in various ways.

Figure 11:
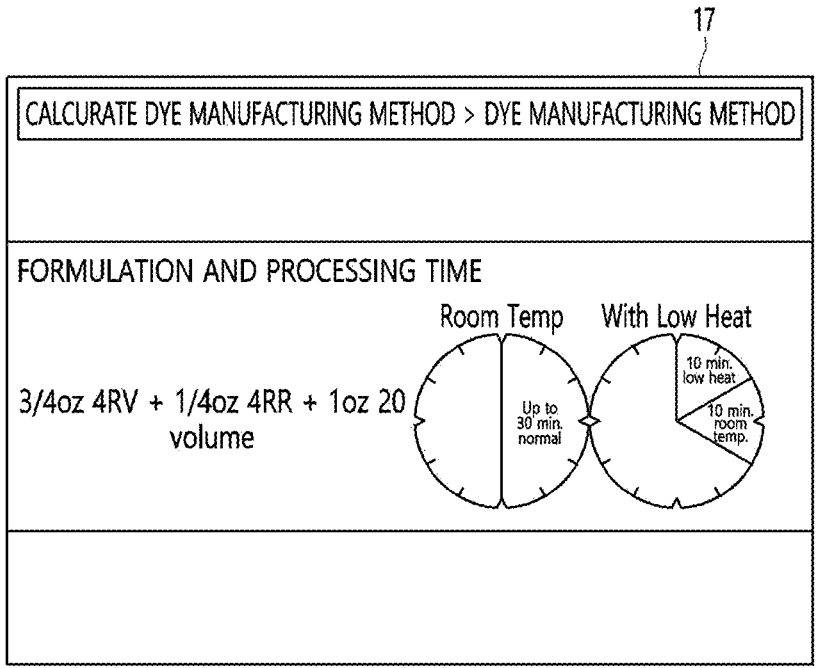
FIG. 11 is a view illustrating an example of a method for the terminal according to the embodiment of the present disclosure to display a method of manufacturing a calculated dye.

When the control unit 11 calculates the dye manufacturing method, the control unit 11 may display the dye manufacturing method as shown in FIG. 11.

FIG. 11 is a view illustrating an example of a method for the terminal according to the embodiment of the present disclosure to display a method of manufacturing a calculated dye.

The display unit 15 may display the calculated dye manufacturing method. Referring to the example of FIG. 11, the display unit 15 may display the type and discharge amount (¾ oz 4RV+¼ oz 4RR+1 oz 20 volume) of the dye material, and a recommended temperature when the dye is used. The recommended temperature may include a temperature (room temp) and time information of a space where the dyeing is made, whether or not to heat with additional heat (with low heat), and time information.

Meanwhile, in step S20, when receiving the command for manufacturing the dye for each hair zone, the control unit 11 may receive the current color, the target color, and the sub-information for each hair zone.

Meanwhile, the control unit 11 may receive at least one of an input for selecting the number of hair zones and an input for selecting a hair zone before receiving the dye related information.

The hair zone may refer to each zone in the hair that is divided so that different dyes are used.

The number of hair zones may refer to the number of zones in the hair divided so that different dyes are used.

The hair zone and the number of hair zones may be preset or may be set by the user.

First, a method of receiving an input for selecting the hair zone will be described.

Figure 12:
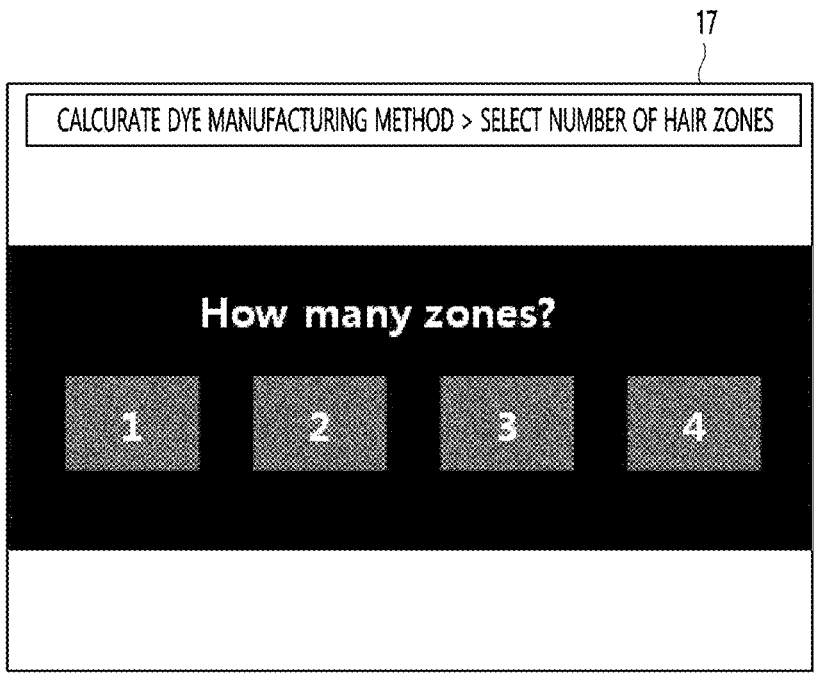
FIG. 12 is a view illustrating an example of a method for the terminal according to the embodiment of the present disclosure to receive a command for selecting the number of hair zones.

FIG. 12 is a view illustrating an example of a method for the terminal according to the embodiment of the present disclosure to receive a command for selecting the number of hair zones.

The display unit 17 may display a screen for selecting the number of hair zones as shown in FIG. 12. The control unit 11 may set the number of hair zones to 2 when receiving a command for selecting 2 on the screen and set the number of hair zones to 4 when receiving a command for selecting 4 on the screen. Meanwhile, the example of FIG. 12 illustrates that the display unit 17 displays that the number of hair zones is selected as any one of 1 to 4, but this is merely illustrative for convenience of description, and thus the present disclosure is not limited thereto. That is, the number of hair zones to which the control unit 11 may receive input may vary.

As described above, the control unit 11 may set the number of hair zones by receiving the command for selecting the number of hair zones.

The control unit 11 may receive an input for selecting a hair zone after setting the number of hair zones.

According to a first embodiment, the display unit 17 may display an image including hair, and the control unit 11 may receive an input for selecting a hair zone through the image displayed on the display unit 17.

Figure 13:
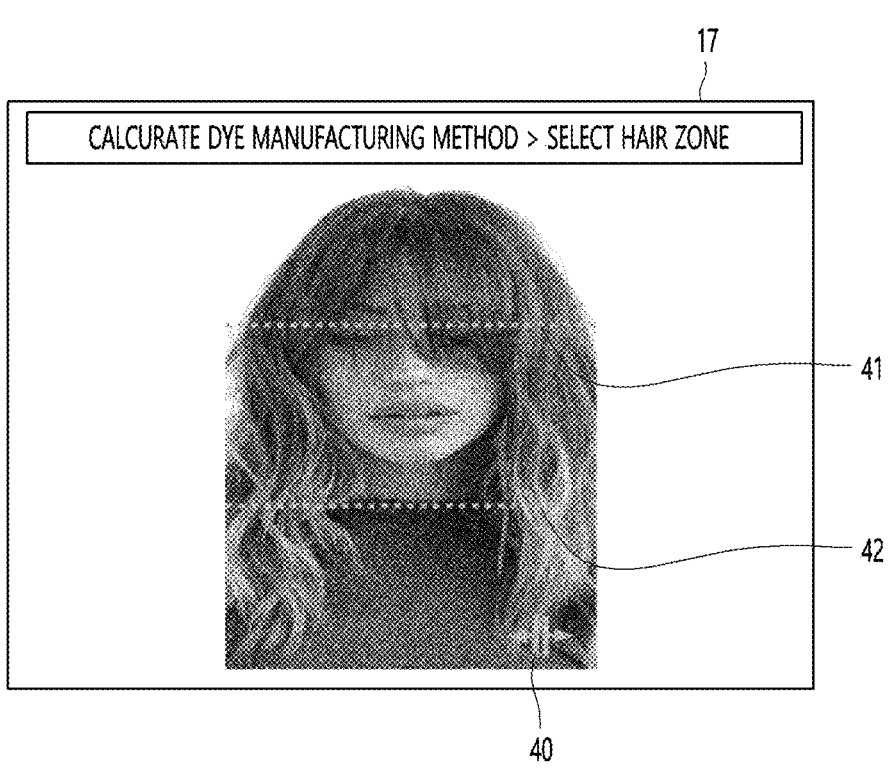
FIGS. 13 to 14 are views illustrating an example of a method for the terminal according to the embodiment of the present disclosure to receive a command for selecting a hair zone.
Figure 14:
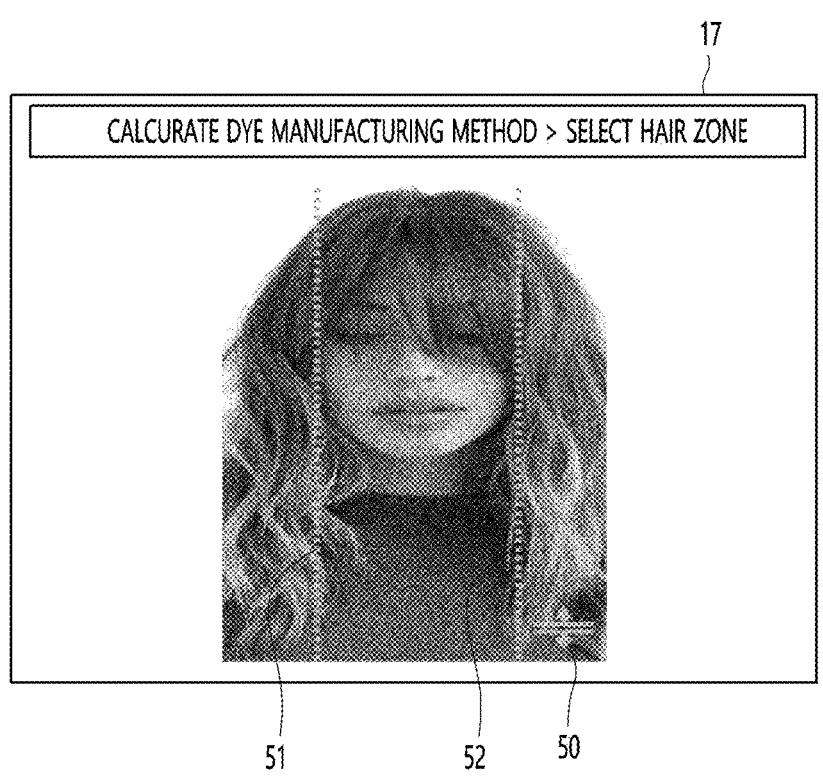

FIGS. 13 to 14 are views illustrating an example of a method for a terminal according to an embodiment of the present disclosure to receive a command for selecting a hair zone.

The display unit 17 may display an image including hair. In this case, the image may be an image previously stored in the storage unit 19 or an image received from the outside through the communication unit 15. Alternatively, the image may be an image of a user captured through a camera (not shown) provided in the terminal 1.

The control unit 11 may display at least one dividing line for dividing the hair zone together with the image. The dividing line may be a straight line as shown in FIG. 13 or FIG. 14, but this is merely illustrative. That is, the dividing line may be a curved line unlike FIG. 13 or FIG. 14, and in this case, the user may more freely select the hair zone. In FIGS. 13 and 14, it is assumed that the dividing line is a straight line.

The control unit 11 may control the display unit 17 to display horizontal dividing lines 41 and 42 on the image as shown in FIG. 13 or to display vertical dividing lines 51 and 52 on the image as shown in FIG. 14.

The control unit 11 may control the display unit 17 to further display a line change icon 40 when displaying the horizontal dividing lines 41 and 42 on the image. When receiving a command for selecting the line change icon 40, the control unit 11 may change the horizontal dividing lines 41 and 42 displayed on the image to the vertical dividing lines 51 and 52.

In addition, the control unit 11 may receive a command for dragging and dropping in one direction by selecting any one of the horizontal dividing lines 41 and 42. Accordingly, the control unit 11 may change a position of the selected horizontal dividing line to a dropped position. When the positions of the horizontal dividing lines 41 and 42 are determined, the control unit 11 may set the hair zone based on the horizontal dividing lines 41 and 42.

Similarly, the control unit 11 may control the display unit 17 to further display a line change icon 50 when displaying the vertical dividing lines 51 and 52 on the image. When receiving a command for selecting the line change icon 50, the control unit 11 may change the vertical dividing lines 51 and 52 displayed on the image to the horizontal dividing lines 41 and 42.

In addition, the control unit 11 may receive a command for dragging and dropping in one direction by selecting any one of the vertical dividing lines 51 and 52. Accordingly, the control unit 11 may change a position of the selected vertical dividing line to a dropped position. When the positions of the vertical dividing lines 51 and 52 are determined, the control unit 11 may set the hair zone based on the vertical dividing lines 51 and 52.

As described above, according to the first embodiment, there is an advantage that the user may easily select the hair zone with only the drag and drop command of the dividing line displayed on the display unit 17.

Meanwhile, when calculating a cosmetic manufacturing method other than a dye, the terminal 1 may display a dividing line for dividing a face other than the hair zone into a plurality of face zones. That is, the terminal 1 may set the number of face zones, display the dividing line to classify the face zones according to the set number of face zones, and classify the face zones by adjusting the position of the dividing line.

According to this, the terminal 1 may differently calculate the cosmetic manufacturing method for each face zone. Therefore, the terminal 1 may differently calculate a foundation manufacturing method for each face zone, and in this case, there is an advantage that cosmetics having different colors and textures may be manufactured for each face zone. In addition, the terminal 1 may differently calculate a manufacturing method of basic cosmetics for each face zone, and in this case, there is an advantage that cosmetics having different functional ingredients may be manufactured for each face zone. That is, there is an advantage that the user may easily receive necessary cosmetics according to a state of each face zone.

According to a second embodiment, the display unit 17 may display a plurality of previously divided hair zones, and the control unit 11 may receive an input for selecting the hair zone through a command for selecting at least one of the plurality of hair zones.

Meanwhile, the control unit 11 may receive an input for selecting the hair zone through various methods other than the above-described embodiments. In addition, according to an embodiment, since the hair zones are predetermined, an input for separately selecting the hair zone may not be received even when a command for manufacturing the dye for each hair zone is received.

When the hair zone is determined, the control unit 11 may receive an input of the current color for each hair zone in step S32 and may receive an input of the target color for each hair zone in step S33.

Figure 16:
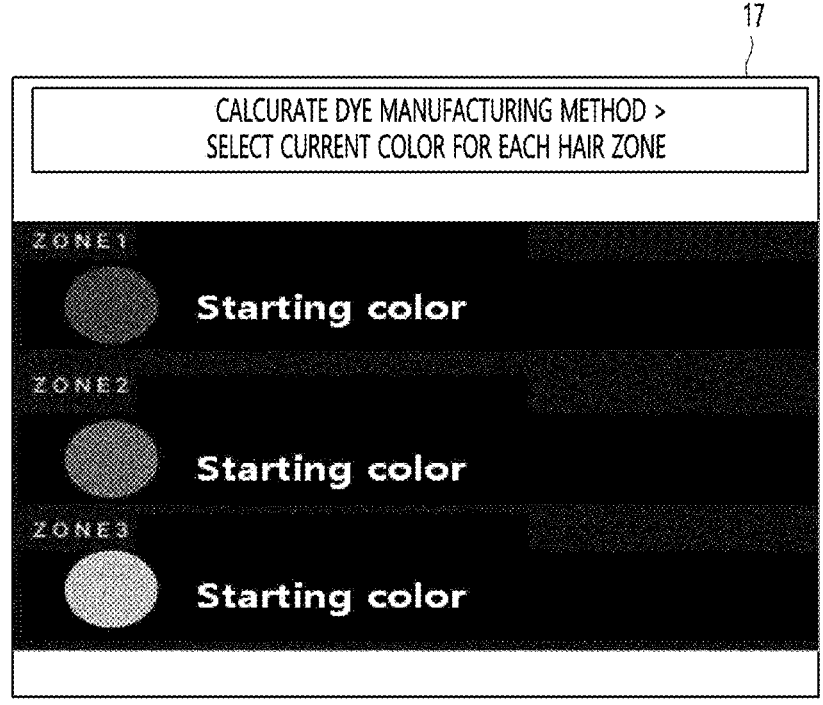
FIG. 16 is a view illustrating an example of a method for the terminal according to the embodiment of the present disclosure to receive a command for selecting a target color for each hair zone.

FIG. 15 is a view illustrating an example of a method for the terminal according to the embodiment of the present disclosure to receive a command for selecting a current color for each hair zone, and FIG. 16 is a view illustrating an example of a method for the terminal according to the embodiment of the present disclosure to receive a command for selecting a target color for each hair zone.

As shown in FIGS. 15 and 16, the control unit 11 may control the display unit 17 to display a screen for receiving the command for selecting the current color and the command for selecting the target color for each hair zone. For example, the control unit 11 may set the number of hair zones to three, and when three hair zones are set, the control unit 11 may receive the command for selecting the current color and the command for selecting the target color for each of the three hair zones.

A method of receiving the command for selecting the current color and the command for selecting the target color is the same as described in steps S22 and S23, and thus a redundant description will be omitted.

In addition, the control unit 11 may receive an input of sub-information including at least one of a dying type, a dye amount, a thickener option, an oxidizer option, and an additional color option for each hair zone (S34).

Figure 17:
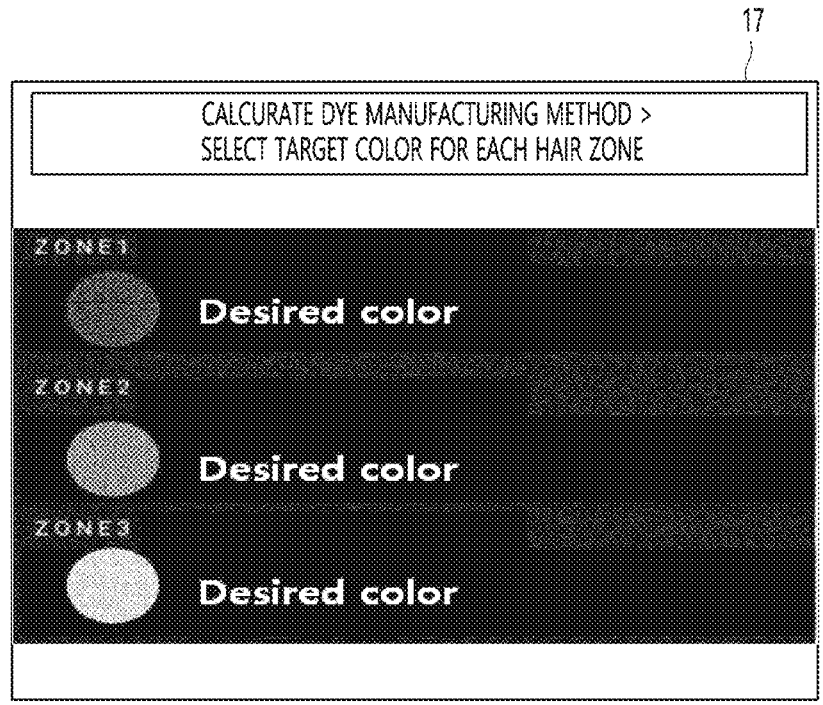
FIG. 17 is a view illustrating an example of a method for the terminal according to the embodiment of the present disclosure to receive an input of a dying type for each hair zone.

FIG. 17 is a view illustrating an example of a method for the terminal according to the embodiment of the present disclosure to receive an input of a dying type for each hair zone.

As shown in FIG. 17, the control unit 11 may control the display unit 17 to display a plurality of hair zones ZONE 1, ZONE 2, and ZONE 4 and may receive an input of a dying type for each of the plurality of hair zones.

Similarly, although not shown in the drawings, the control unit 11 may receive an input of a dye amount, a thickener option, an oxidizer option, or an additional color option for each of the plurality of hair zones. Specifically, as shown in FIG. 10, the control unit 11 may receive an input of sub-information for each hair zone by displaying a screen for receiving the input of the dye amount, the thickener option, the oxidizer option, and the additional color option for each hair zone.

As described above, the control unit 11 may select the dying type, the dye amount, the thickening option, the oxidizer option, and the additional color option for each hair zone.

The control unit 11 may calculate the dye manufacturing method based on at least one of the current color, the target color, and the sub-information for each hair zone in step S36.

For example, when calculating the dye manufacturing method for each hair zone, the control unit 11 may calculate the dye manufacturing method so that the discharge amount of the dye material is different depending on the hair zone or may differently calculate the dye manufacturing method by differently determining a dyeing time depending on the hair zone.

For example, the control unit 11 may calculate a dye manufacturing method in which the oxidizer amount is a first amount and the dyeing time is a first time for a dye to be used in a first hair zone close to the scalp and may calculate a dye manufacturing method in which the oxidizer amount is a second amount less than the first amount and the dyeing time is a second time shorter than the first time for a dye to be used in a second hair zone close to the tip of the hair. In this case, since the oxidizer is less added to the zone close to the tip of the hair which is relatively thin and severely damaged than the zone close to the scalp, and the dye manufacturing method is calculated so that the dyeing time is short, there is an advantage that a color developed throughout the hair is similar and the dye may be calculated for each zone so that the degree of damage to the tip of the hair is minimized.

In addition, since the control unit 11 calculates the dye manufacturing method for each hair zone when receiving the command for manufacturing the dye for each hair zone, the display unit 17 may display the calculated dye manufacturing method in plural unlike FIG. 11.

In addition, the method of calculating the dye manufacturing method for each hair zone is slightly different from that of step S26 in that it is calculated and displayed for each hair zone and the rest are the same, and thus a redundant description will be omitted.

According to an embodiment, when the dye manufacturing method is calculated, the control unit 11 may control the display unit 17 to display a simulation based on the calculated dye manufacturing method. The simulation may be a prediction result when a dye manufactured according to the calculated dye manufacturing method is used.

Figure 18:
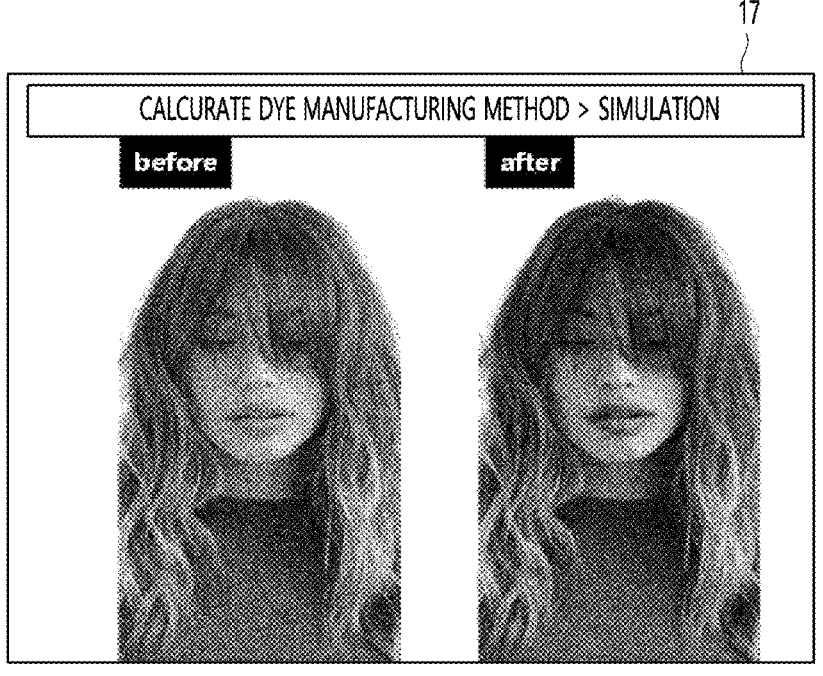
FIG. 18 is a view illustrating an example of a method for the terminal according to the embodiment of the present disclosure to display a simulation.

FIG. 18 is a view illustrating an example of a method for the terminal according to the embodiment of the present disclosure to display a simulation.

The control unit 11 may control the display unit 17 to display the simulation according to the calculated dye manufacturing method.

According to an embodiment, the control unit 11 may control the display unit 17 to display the simulation after the current color, the target color, and the sub-information are all selected.

According to another embodiment, the control unit 11 may control the display unit 17 to display the simulation after the current color and the target color are selected and before the sub-information is selected. In this case, the user may correct the target color after confirming the simulation and select the sub-information based on the simulation even when selecting the sub-information, and thus there is an advantage that the selection of the sub-information is easy.

According to still another embodiment, the control unit 11 may control the display unit 17 to primarily display the simulation after the current color and the target color are selected, and to secondarily display the simulation after the sub-information is selected.

In addition, the control unit 11 may control the display unit 17 to display the simulation regardless of whether or not the dye for each hair zone is manufactured. That is, the control unit 11 may control the display unit 17 to display all simulations when calculating the dye manufacturing method without dividing the hair zone and when calculating the dye manufacturing method by dividing the hair zone.

FIG. 5 will be described again.

When the dye manufacturing method is calculated, the control unit 11 may transmit the calculated dye manufacturing method to the dispenser 3 in step S15.

The dispenser 3 may receive the dye manufacturing method from the terminal 1 and may generate the dye according to the received dye manufacturing method in step S17.

When the dispenser 3 receives the dye manufacturing method from the terminal 1, the dispenser 3 may generate the dye according to the received dye manufacturing method.

When the dispenser 3 receives the dye manufacturing method in plural from the terminal 1, the dispenser 3 may manufacture the dye according to each of the plurality of dye manufacturing methods. That is, in this case, the dispenser 3 may manufacture the dye for each hair zone.

FIG. 19 is a view illustrating an example of a screen displayed when the dispenser according to an embodiment of the present disclosure receives a method of manufacturing a dye for each hair zone.

The dispenser 3 may control the display unit (not shown) to display the dye manufacturing method received from the terminal 1. For example, when the dispenser 3 receives the dye manufacturing method in plural from the terminal 1, the dispenser 3 may control the display unit (not shown) to display the plurality of dye manufacturing methods.

The screen of FIG. 19 may be an example of a screen on which the dispenser 3 displays the plurality of dye manufacturing methods. As shown in the screen of FIG. 19, the display unit (not shown) of the dispenser 3 may respectively display the dye manufacturing method calculated for each hair zone. Referring to the example of FIG. 19, the display unit (not shown) of the dispenser 3 may display each of a method of manufacturing a first dye for manufacturing 2 oz of a dye for dyeing a hair of a first hair zone (ZONE 1) from color 7A to color 9B, a method of manufacturing a second dye for manufacturing 2 oz of a dye for dyeing a hair of a second hair zone (ZONE 2) from color 7A to color 11B, and a method of manufacturing a third dye for manufacturing 2 oz of a dye for dyeing a hair of a third hair zone (ZONE 3) from 6B color to 8C color. The control unit 31 may generate a dye according to a method of manufacturing the selected dye when receiving a discharge command (a command for selecting a 'DISPENSE' icon) after any one of a plurality of displayed dye manufacturing methods is selected. For example, when the control unit 31 receives a discharge command for all of the three dyeing methods shown in FIG. 19, the control unit 31 may drive the driving unit 37 to discharge the three dyes to each container (not shown).

The present disclosure described above may be implemented as computer-readable codes in a medium on which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, and an optical data storage, etc. In addition, the computer may include the control unit of the terminal 1 or the control unit 31 of the dispenser 3. Therefore, the above detailed description should not be construed in a limiting sense in all respects, and should be considered as examples. The scope of the present invention should be determined by rational interpretation of the appended claims, and encompasses all alterations falling within the equivalent scope of the appended claims.

The above description is merely illustrative of the technical spirit of the present invention, and various modifications and variations will be possible without departing from the essential characteristics of the present invention by those skilled in the art to which the present invention pertains.

Therefore, the embodiments disclosed in the present invention are not intended to limit the technical spirit of the present invention, but to explain, and the scope of the technical spirit of the present invention is not limited by these embodiments.

The protection scope of the present invention should be construed by the following claims, and all technical ideas within the equivalent range should be construed as being included in the scope of the present invention.

The invention claimed is:
1. A terminal comprising:
a storage configured to store data on a cosmetic manufacturing method;
an input unit configured to receive an input of a current color and a target color; and a controller configured to calculate the cosmetic manufacturing method for developing from the current color to the target color based on the data, wherein the controller is configured to calculate the cosmetic manufacturing method including at least one cartridge for discharging a cosmetic material and a discharge amount of the cosmetic material from each of the at least one cartridge storing the cosmetic material, and control the storage to store the calculated cosmetic manufacturing method, wherein the controller is further configured to:

receive at least one of a first input for selecting a number of hair zones from a first setting screen for dividing so that different dyes are used and a second input for selecting one of hair zones from a hair image through the input unit, display at least one dividing line including a first direction dividing line for dividing the hair zones based on the selected number of the hair zones, change the first direction dividing line to a second direction dividing line for dividing the hair zones based on the selected number of the hair zones line when receiving a first command for selecting a line change icon, receive a third input for selecting the current color and the target color for each hair zone from a second setting screen, and calculate a dye manufacturing method based on the current color and the target color for each hair zone.

2. The terminal of claim 1, wherein the data includes a table in which the at least one cartridge for discharging the cosmetic material and the discharge amount of the cosmetic material from each of the at least one cartridge are mapped according to each of the current color and the target color.

3. The terminal of claim 1, wherein the input unit further receives an input of a dyeing type, and the controller differently calculates the cosmetic manufacturing method according to the dyeing type.

4. The terminal of claim 3, wherein when the current color and the target color are the same but the dyeing type is input differently, the controller differently calculates the cosmetic manufacturing method.

5. The terminal of claim 3, wherein the controller differently calculates the cosmetic manufacturing method by adjusting the at least one cartridge for discharging the cosmetic material and the discharge amount.

6. The terminal of claim 1, wherein the input unit further receives an input of a dye amount, and the controller differently calculates the cosmetic manufacturing method by adjusting the discharge amount according to the dye amount.

7. The terminal of claim 1, wherein the input unit further receives an input for adding at least one of a thickener and an oxidizer, and the controller modifies the cosmetic manufacturing method when receiving the input for adding the thickener or the oxidizer.

8. The terminal of claim 1, wherein the controller calculates the cosmetic manufacturing method so that a discharge amount of dye material differs depending on each hair zone.

9. The terminal of claim 1, wherein the controller differently calculates the cosmetic manufacturing method by determining a dyeing time to be different depending on each hair zone.

10. The terminal of claim 1, wherein the controller further calculates a recommended temperature when a dye is used.

11. The terminal of claim 1, further comprising a communication unit for transmitting the cosmetic manufacturing method to a dispenser for manufacturing the cosmetic material.

12. The terminal of claim 1, wherein the controller is further configured to:

change a position of the second direction dividing line changed on the hair image to a dropped position when receiving a second command for dragging and dropping in one direction by selecting the changed second direction dividing line, and set a hair zone based on the second direction dividing line, when determining the position of the selected second direction dividing line.

13. The terminal of claim 1, wherein the first direction dividing line and the second direction dividing line are straight lines.

14. A dispenser comprising:

a storage configured to store data on a cosmetic manufacturing method;

an input unit configured to receive an input of a current color and a target color; and a controller configured to calculate the cosmetic manufacturing method for developing from the current color to the target color based on the data, wherein the controller is configured to calculate the cosmetic manufacturing method including at least one cartridge for discharging a cosmetic material and a discharge amount of the cosmetic material from each of the at least one cartridge storing the cosmetic material, and control the storage to store the calculated cosmetic manufacturing method, wherein the controller is further configured to:

receive at least one of a first input for selecting a number of hair zones from a first setting screen for dividing so that different dyes are used and a second input for selecting one of the hair zones from a hair image through the input unit, display at least one dividing line including a first direction dividing line for dividing the hair zones based on the selected number of the hair zones, change the first direction dividing line to a second direction dividing line for dividing the hair zones based on the selected number of the hair zones line when receiving a first command for selecting a line change icon, receive a third input for selecting the current color and the target color for each hair zone from a second setting screen, and calculate a dye manufacturing method based on the current color and the target color for each hair zone.

15. A cosmetic manufacturing method calculation system comprising:

a dispenser including at least one cartridge for accommodating a cosmetic material; and a terminal for calculating a cosmetic manufacturing method for developing from a current color to a target color based on data on the cosmetic manufacturing method when the current color and the target color are input, wherein the terminal is configured to calculate the cosmetic manufacturing method by calculating a discharge amount of the cosmetic material from each cartridge storing the cosmetic material, and store the calculated cosmetic manufacturing method, wherein the terminal is further configured to:

receive at least one of a first input for selecting a number of hair zones from a first setting screen for dividing so that different dyes are used and a second input for selecting one of hair zones from a hair image, display at least one dividing line including a first direction dividing line for dividing the hair zones based on the selected number of the hair zones;

change the first direction dividing line to a second direction dividing line for dividing the hair zones based on the selected number of the hair zones line when receiving a first command for selecting the line change icon, receive a third input for selecting the current color and the target color for each hair zone from a second setting screen, and calculate a dye manufacturing method based on the current color and the target color for each hair zone.

16. A cosmetic manufacturing method calculation system comprising:

a dispenser including at least one cartridge for accommodating a cosmetic material and storing data for code interpretation; and a terminal for generating a code for manufacturing the cosmetic material and transmitting the generated code to the dispenser when a current color and a target color are input, wherein the dispenser is configured to acquire information of a discharge amount of the cosmetic material from each of the at least one cartridge by decoding the code, wherein the terminal is configured to generate the code by:

receiving at least one of a first input for selecting a number of hair zones from a first setting screen for dividing so that different dyes are used and a second input for selecting one of the hair zones from a hair image, displaying at least one dividing line including a first direction dividing line for dividing the hair zones based on the selected number of the hair zones, changing the first direction dividing line to a second direction dividing line for dividing the hair zones based on the selected number of the hair zones line when receiving a first command for selecting a line change icon, receiving a third input for selecting the current color and the target color for each hair zone from a second setting screen, and calculating a dye manufacturing method based on the current color and the target color for each hair zone.

17. An operating method of a cosmetic manufacturing method calculation system, the system including a dispenser including at least one cartridge for accommodating a cosmetic material, and a terminal for calculating a cosmetic manufacturing method for developing from a current color to a target color, the operating method comprising:

storing data on the cosmetic manufacturing method;

receiving at least one of a first input for selecting a number of hair zones from a first setting screen for dividing so that different dyes are used and a second input for selecting one of hair zones from a hair image;

displaying at least one dividing line including a first direction dividing line for dividing the hair zones based on the selected number of the hair zones;

changing the first direction dividing line to a second direction dividing line for dividing the hair zones based on the selected number of the hair zones line when receiving a first command for selecting a line change icon;

receiving a third input for selecting the current color and the target color for each hair zone from a second setting screen; and calculating a dye manufacturing method based on the current color and the target color for each hair zone, wherein the calculating of the cosmetic manufacturing method includes calculating a discharge amount of the cosmetic material from each of the at least one cartridge of the dispenser.

* * * * *